(12) United States Patent
Bernard

(10) Patent No.: US 11,067,114 B2
(45) Date of Patent: Jul. 20, 2021

(54) COMPOSITE END CONNECTIONS

(71) Applicant: Crompton Technology Group Limited, West Midlands (GB)

(72) Inventor: James Bernard, Brackley (GB)

(73) Assignee: CROMPTON TECHNOLOGY GROUP LIMITED, Solihull (GB)

(*) Notice: Subject to any disclaimer, the term of this patent is extended or adjusted under 35 U.S.C. 154(b) by 511 days.

(21) Appl. No.: 15/928,138

(22) Filed: Mar. 22, 2018

(65) Prior Publication Data

US 2018/0283425 A1 Oct. 4, 2018

(30) Foreign Application Priority Data

Mar. 31, 2017 (EP) .................................. 17164427

(51) Int. Cl.
*F16C 3/02* (2006.01)
*F16B 7/18* (2006.01)
*B29C 65/00* (2006.01)

(52) U.S. Cl.
CPC ............ *F16C 3/026* (2013.01); *B29C 66/742* (2013.01); *F16B 7/18* (2013.01)

(58) Field of Classification Search
CPC ......... B29C 43/02; B29C 57/02; B29C 65/56; B29C 65/567; B29C 66/70; B29C 66/712; B29C 66/721; B29C 66/74; B29C 66/742; B29C 65/568; B29L 2031/06; B29L 2031/24; F16B 7/02; F16B 7/18; F16B 17/004; F16C 3/023; F16C 3/026;
(Continued)

(56) References Cited

U.S. PATENT DOCUMENTS 3,661,670 A * 5/1972 Pierpont, Jr. ......... B29C 53/805
156/172
3,881,973 A 5/1975 Pinckney
(Continued)

FOREIGN PATENT DOCUMENTS

CN 104132207 A 11/2014
DE 3641632 A1 6/1988
(Continued)

OTHER PUBLICATIONS

Extended European Search Report for International Application No. 17164427.1 dated Sep. 28, 2017, 7 pages.

*Primary Examiner* — Josh Skroupa
(74) *Attorney, Agent, or Firm* — Cantor Colburn LLP

(57) ABSTRACT

A composite structural component made of a polymer matrix composite material includes an end connection that includes an end portion at one end of the composite structural component, comprising an internal surface comprising a plurality of ridges and grooves defining a first engagement surface along an axial direction and a metal interface component comprising an outer surface comprising a plurality of ridges and grooves defining a second engagement surface along the axial direction and an inner surface defining a mounting surface for attachment of an end fitting. The metal interface component is engaged with the internal surface of the composite structural component by mating of the first and second engagement surfaces. The structure also includes an outer annular component fitted around the end portion in axial alignment with the mating of the first and second engagement surfaces.

14 Claims, 2 Drawing Sheets

Figure 1:
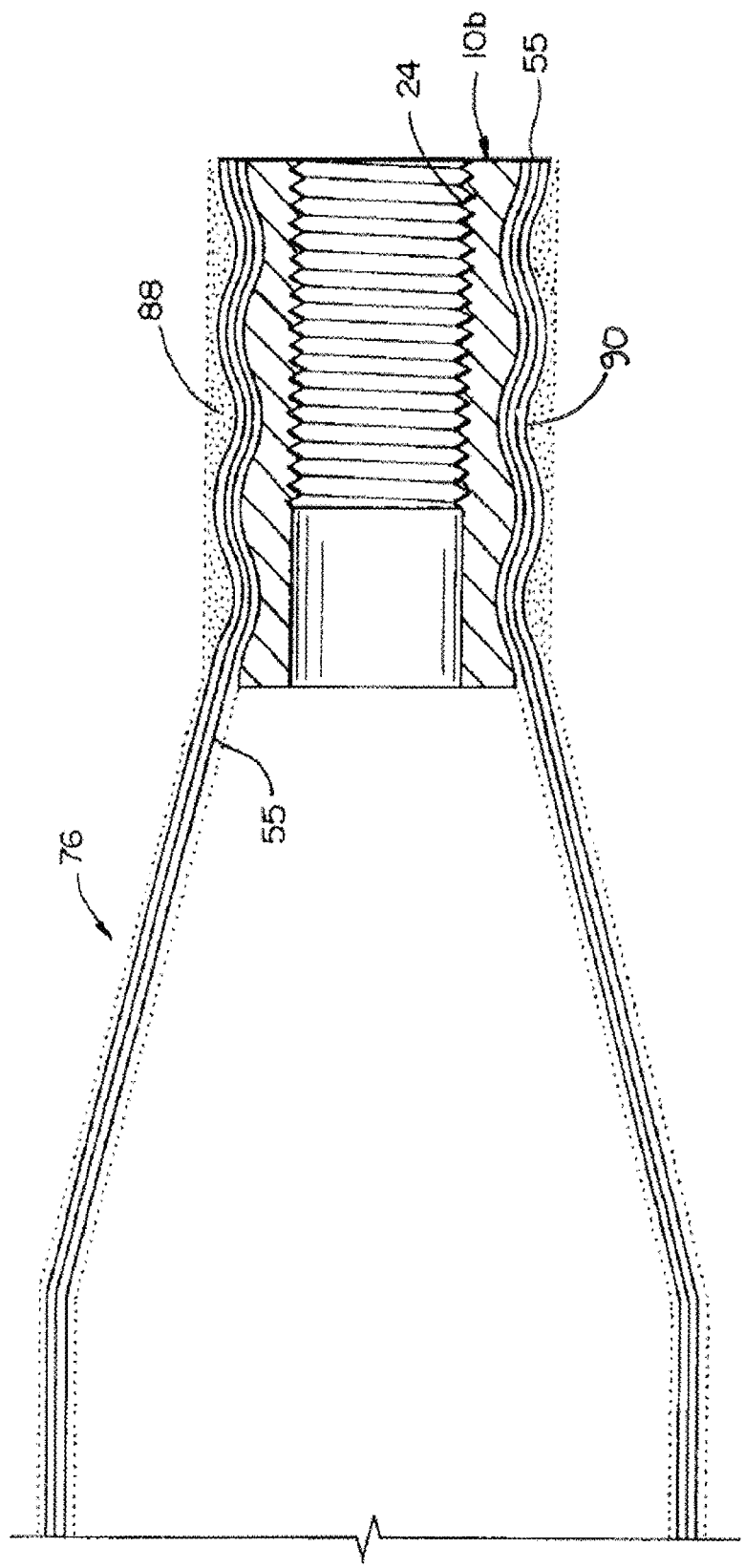

(58) Field of Classification Search
CPC .............. F16C 2226/10; F16C 2226/60; F16C 2229/00; F16C 2326/43; F16D 1/072; F16D 1/08; F16D 1/0852; Y10T 403/349; Y10T 403/49; Y10T 403/4958; Y10T 403/7064; Y10T 403/7073
USPC ................... 403/179, 274, 281, 374.1, 375; 464/181–183
See application file for complete search history.

(56) References Cited

U.S. PATENT DOCUMENTS

| | | | | |
|---|---|---|---|---|
| 4,050,827 A | * | 9/1977 | Jonda | ............... B64C 11/26 403/11 |
| 4,319,076 A | * | 3/1982 | Piur | ............... H01B 17/32 174/178 |
| 4,451,245 A | * | 5/1984 | Hornig | ............... F16D 1/072 464/181 |
| 4,647,078 A | | 3/1987 | Lundy | |
| 5,082,314 A | | 1/1992 | Aubry et al. | |
| 5,160,392 A | * | 11/1992 | Thongs, Jr. | ........... B29C 53/585 156/172 |
| 6,379,763 B1 | | 4/2002 | Fillman | |
| 7,731,593 B2 | * | 6/2010 | Dewhirst | ............... F16D 1/072 464/181 |
| 9,056,431 B2 | * | 6/2015 | Bond | ............... B29C 70/30 |
| 9,352,538 B1 | * | 5/2016 | Olason | ............... B29C 53/586 |
| 2003/0107186 A1 | * | 6/2003 | Salama | ............... E21B 17/01 277/602 |
| 2011/0186211 A1 | | 8/2011 | Fahey et al. | |
| 2012/0163905 A1 | | 6/2012 | Bond et al. | |

FOREIGN PATENT DOCUMENTS

| | | |
|---|---|---|
| DE | 202008015768 U1 | 4/2010 |
| WO | 2010060945 A1 | 6/2010 |

* cited by examiner

COMPOSITE END CONNECTIONS

FOREIGN PRIORITY

This application claims priority to European Patent Application No. 17164427.1 filed Mar. 31, 2017, the entire contents of which is incorporated herein by reference.

TECHNICAL FIELD

The present disclosure relates to composite end connections, in particular end connections of a composite structural component made of a polymer matrix composite material. This disclosure is concerned with end connections that can transmit axial loads to/from a composite structural component.

BACKGROUND

Composite structural components are typically made of a polymer matrix composite material, often a fibre-reinforced polymer matrix composite material using glass and/or carbon fibre reinforcement, e.g. carbon fibre reinforced polymer (CFRP). Composite structural components offer the opportunity for lightweight and cost effective load transmission solutions. The largest benefits are often achieved when the load path and geometry are simple. Axial load transmission components, for example rods and struts, are ideal candidates for polymer matrix composite material and such composite structural components are increasingly being used on commercial aircraft in addition to automotive and construction industries. These composite structural components generally require an end connection having a complex form to interface with other components. Metals are efficient in terms of weight and cost for forming an end connection having a complex geometry. However, joining a composite structural component to a metallic component to form an end connection poses significant challenges, especially in the aerospace industry where the joint must be formed in a robust and certifiable manner.

It is known to form a load bearing end connection for a fibre-reinforced composite material component using a metal insert embedded inside a cylindrical structure made of a polymer matrix composite material. To manufacture such an end connection, the metal insert may be located onto a mandrel and the composite material structure then filament wound over the assembly. Upon curing, the mandrel is removed leaving the metal insert embedded inside the composite material structure. The metal insert may include a threaded bore that provides a mounting point for attaching the end connection to other components for the transmission of generally axial loads. Such an end connection is seen in U.S. Pat. No. 6,379,763.

Such an end connection relies on undulations at an engagement surface between the metal insert and an internal surface of the composite material structure. The metal insert includes an elongate body having a plurality of undulations formed along its longitudinal sides. The undulations engage the fibres in the polymer matrix of the composite material structure so as to transmit loads from the metal insert into the body of the composite material structure. However the applicant has recognised that this kind of end connection is prone to fretting damage from fatigue or cyclic loading, which may result in failure. As the joint undergoes cyclic axial loading, fretting of the relatively soft fibre-reinforced composite material against the metal undulations is inevitable.

The present disclosure seeks to provide an end connection of a composite structural component which may not experience wear and damage from fretting. The present disclosure also seeks to provide an end connection of a composite structural component which may have an increased strength to weight ratio and an increased strength to cost ratio.

SUMMARY

According to the present disclosure there is provided: An end connection for a composite structural component made of a polymer matrix composite material; the end connection comprising: an end portion at one end of the composite structural component, comprising an internal surface comprising a plurality of ridges and grooves defining a first engagement surface along an axial direction; a metal interface component comprising an outer surface comprising a plurality of ridges and grooves defining a second engagement surface along the axial direction and an inner surface defining a mounting surface for attachment of an end fitting; wherein the metal interface component is engaged with the internal surface of the composite structural component by mating of the first and second engagement surfaces; and an outer annular component fitted around the end portion in axial alignment with the mating of the first and second engagement surfaces; wherein the outer annular component forms an interference fit with the end portion so as to preload the end connection with compressive radial forces.

It will be appreciated that an end connection in accordance with the present disclosure takes advantage of an outer annular component that forms an interference fit with the end portion of the composite structural component so as to preload the end portion with compressive radial forces. When an axial load is applied to the end connection during service, reaction forces at the first and second engagement surfaces provide axial load resistance (equal to the horizontal component of the frictional force which is equal to the reaction force multiplied by the friction coefficient between the engagement surfaces). This axial load resistance mitigates fretting at the engagement surfaces. The preloading therefore acts to prohibit relative movement between the first and second engagement surfaces so as to avoid fretting damage, especially under cyclic loading.

Furthermore, it will be appreciated that preloading the end connection with compressive radial forces results in hoop stress in the end portion of the composite structural component. Because the outer annular component preloads the joint in hoop compression, the resulting hoop tension is lower when an axial load is transmitted by the end connection, resulting in a very high strength to weight ratio.

It will also be recognised that the outer annular component fitted around the end portion can be distinguished from a circumferential layer of fibre-reinforced composite that may be formed, for example, by winding one or more layers of "hoop" fibre over an end connection during manufacture of the end portion. During the necessary heating and curing of the fibre-reinforced polymer matrix, any hoop compression applied by the "hoop" fibre will be released. In contrast, an outer annular component that is applied in a subsequent manufacturing step to form an interference fit with the end portion can apply compressive radial forces and hence hoop compression. This preload then acts to prevent fretting movements when the end connection is subjected to an axial tension or compression load in use.

When fitting the outer annular component around the end portion of the composite structural component, the degree of interference fit may be chosen to apply a desired level of preload to the first and second engagement surfaces. The degree of interference fit may be chosen taking into account operational factors such as the expected or intended axial loads to be transmitted during use. In addition, or alternatively, the degree of interference fit may be chosen taking into account structural factors such as the diameter and/or wall thickness of the composite structural component. In addition, or alternatively, the degree of interference fit may be chosen taking into account structural factors such as the angle of the ridges and grooves on the outer surface of the metal interface component. In addition, or alternatively, the degree of interference fit may be chosen taking into account factors that affect the radial compressive strength of the composite structural component, such as the void content, volume fraction of fibre, fibre stiffness e.g. elastic modulus, and/or selected layup of the polymer matrix composite material—one or more of which may dictate the level of preload that can be supported. In at least some examples, the outer annular component forms an interference fit of about 0.1 mm with the end portion of the composite structural component. In preferred examples the interference fit is at least 80 microns, preferably at least 100 microns, more preferably at least 150 microns. This distance represents the size difference (i.e. overlap) between the internal diameter of the outer annular component and the outer diameter of the end portion.

The outer annular component may take any suitable form as long as it forms a continuous circumferential structure around the end portion of the composite structural component. The outer annular component may be generally cylindrical in shape. The outer annular component may be solid or partially segmented. In at least some examples, the outer annular component may take the form of a hoop ring, collar or sleeve.

The outer annular component may be made of any suitable rigid material that is capable of forming and maintaining an interference fit with the end portion of the composite structural component. In some examples, the outer annular component is made of a metallic material. In some examples, the outer annular component is made of a polymer matrix composite material, for example a fibre-reinforced polymer material. In some examples, the outer annular component may comprise one or more materials chosen from: polymer matrix composites; metals, alloys (with or without fibre reinforcement). In at least some examples the outer annular component may be made of a stiffer material than the polymer matrix composite material of the composite structural component.

In at least some examples the outer annular component may be fitted around the end portion in direct contact with the polymer matrix composite material. However, the applicant has recognised that typically a component designed to bear axial loads is laid up with longitudinal fibre reinforcement (e.g. 0° fibre tape) or filament wound with reinforcing fibre that is wrapped helically at a low angle (e.g. 8-15°), at least in the main portions of the composite structural component away from the end connection. It may be desirable to provide an outer layer of fibre reinforcement that is wrapped circumferentially at a high angle (e.g. 75-89°) so as to help transmit the hoop compression that results from preloading of the end connection and the hoop tension that results from axial tensile/compressive loads applied to the end connection during service. In at least some examples the end portion of the composite structural component comprises a layer of circumferential fibre reinforcement around which the outer annular component is fitted. The circumferential fibre reinforcement preferably comprises fibres wound at angles of 75-89° around the axial direction. This layer of circumferential fibre reinforcement may also be in axial alignment with the mating of the first and second engagement surfaces. Such "hoop" fibres can also be beneficial during a filament winding process used to form the composite structural component, as the circumferential fibre reinforcement can fill in any crevices resulting from the internal surface comprising a plurality of ridges and grooves. After curing the composite structural component, the layer of circumferential fibre reinforcement can be machined back to form a non-undulating outer surface to which the outer annular component may be fitted. Such manufacturing steps are disclosed in further detail below.

As is discussed above, the outer annular component applies a hoop compression that can counteract hoop stresses generated in the composite structural component when the end connection is subjected to axial tension and/or compression in use. In order for the preloaded compressive radial forces to be converted into reaction and frictional forces at the engagement surfaces, the grooves and ridges must each extend at least partially at an angle θ relative to the axial direction of the engagement surface where $0<θ<90°$. The ridges and grooves may be angled or undulating, for example. An additional benefit of the outer annular component acting to preload the end portion is that the angle of the ridges and grooves can be made lower while still fixing the metal interface component to the internal surface of the composite structural component by mating of the first and second engagement surfaces. A lower angle for the ridges and grooves defining the first engagement surface means that the composite structural component, in particular a fibre-reinforced material component and especially a filament wound component, can be manufactured with better consistency and laminate quality. In turn this results in higher axial strength for the composite structural component. In some preferred examples the ridges and grooves defining the first and/or second engagement surface extend at an angle θ relative to the axial direction of the first and/or second engagement surface, wherein $θ≤20°$. Further preferably the ridges and grooves defining the first and/or second engagement surface extend at an angle θ of about 15°. Such low angles help with winding and laminate quality for a filament wound composite structural component, e.g. made of CFRP. The ridges and grooves may have any suitable angled profile in the axial direction, for example each ridge and groove having a generally triangular or sinusoidal shape in cross section.

It will be appreciated that the function of the ridges and grooves that define the first and second engagement surfaces is to provide a positive interlock that fixes the metal interface component to the internal surface of the composite structural component. The mating of the first and second engagement surfaces provides a frictional engagement. When an axial load is applied to the end connection it is transmitted by the interlocking ridges and grooves. In preferred examples the ridges and grooves do not take the form of axial splines, as would be used for torque transmission. In preferred examples the ridges and grooves take the form of circumferential ridges and grooves, so as to assist in axial load transmission. In some examples the ridges and grooves may take the form of circumferential teeth. In some examples the ridges and grooves may take the form of helical threads. Such helical threads may circumscribe a longitudinal axis of the components at any angle.

The Applicant has realised that it may be desirable to increase the friction coefficient between the first and second engagement surfaces, hence for a given preloaded radial compressive force, more axial resistance will result when the end fitting experiences an axial load during service. In some examples the end connection may comprise a layer of rubber or elastomer material between the first and second engagement surfaces. Of course, other high friction material may be used instead.

The internal surface of the end portion of the composite structural component that carries the plurality of ridges and grooves may be a circumferential or conical surface. The internal surface may extend generally parallel to a longitudinal axis of the composite structural component, or the internal surface may taper overall relative to the longitudinal axis of the composite structural component. Similarly, the outer surface of the metal interface component that carries the plurality of ridges and grooves may be a circumferential or conical surface. The outer surface may extend generally parallel to a longitudinal axis of the metal interface component, or the outer surface may taper relative to the longitudinal axis of the metal interface component. Preferably the internal surface of the composite structural component and the outer surface of the metal interface component substantially match in the end connection. Of course the composite structural component may have an internal surface that continues beyond the metal interface component of the end connection.

For ease of manufacture, especially for a filament wound composite structural component (e.g. made of CFRP), it can be desirable for the metal interface component to have an internal diameter that substantially matches, or is slightly greater than, an internal diameter of the composite structural component away from the end connection. This means that the metal interface component can be placed on the same mandrel as the composite structural component during a filament winding process and embedded into the composite structural component to form the end connection. Thus in some preferred examples a composite structural component comprises the end portion as disclosed above and a main portion, wherein the end portion has a first internal diameter and the main portion has a second, smaller internal diameter that substantially matches the internal diameter of the metal interface component. In at least some examples, the internal surface of the composite structural component tapers radially inwardly from the end portion to the main portion. Alternatively, or in addition, the internal surface of the composite structural component may be stepped between the end portion and the main portion.

In some preferred examples the metal interface component has an internal diameter that substantially matches the second internal diameter of the main portion of the composite structural component. Further preferably the internal diameter of the metal interface component is substantially constant. The internal diameter may be defined by the mounting surface that provides for attachment of an end fitting. This means that the metal interface component is well suited to be mounted on a mandrel so that the composite structural component can be formed around the metal interface component in a filament winding process. In at least some examples, the outer surface of the metal interface component comprises a tapered portion and an engagement portion comprising the plurality of ridges and grooves, wherein the tapered portion tapers radially outwardly from an end of the metal interface component to the engagement portion. The engagement portion may comprise the second engagement surface.

It will be understood that preferably the metal interface component is permanently fixed to the internal surface of the composite structural component in the end connection. Thus the metal interface component described herein can be distinguished from a removable end fitting that can be mounted to and demounted from an end connection. In some preferred examples the metal interface component is embedded into the end connection during manufacture, as will be described further below.

There is disclosed herein an end connection of a composite structural component, also known as a joint. This end connection or joint may be used to attach an end fitting to the composite structural component. In various examples the present disclosure extends to an end connection, or a composite structural component, comprising an end fitting attached to the mounting surface of the metal interface component. Accordingly an end fitting can be attached to an end portion of the composite structural component and axial loads, whether in tension or compression, transmitted through the end connection. The end fitting is typically metallic, although it could be formed from any suitable material. The end fitting may be a metal component. The end fitting may be any suitable mechanical fastener, for example a rod end, a clevis, a socket. The mounting surface of the metal interface component may comprise a thread for screw attachment of an end fitting. Of course other forms of attachment may be provided instead, for example a bayonet attachment.

The composite structural component may comprise an end connection as disclosed herein at one or both ends. In various examples the composite structural component is substantially cylindrical. A composite structural component as disclosed herein may be a strut (e.g. designed to resist longitudinal compression) or a rod (e.g. designed to resist longitudinal tension). In some preferred examples the composite structural component is a piston rod, e.g. a piston rod for a hydraulic or electric actuator. The composite structural component may take the form of any axial load-bearing beam or tube.

A composite structural component as disclosed herein may be made of any suitable polymer matrix composite material. The polymer matrix composite material is preferably a fibre-reinforced polymer matrix composite material, e.g. comprising glass or carbon fibres. In many examples the polymer matrix composite material is carbon fibre reinforced polymer (CFRP). Such materials are inherently corrosion resistant and provide a large weight saving and improved fatigue performance.

The composite structural component may be made using any suitable manufacturing technique. A fibre-reinforced polymer matrix composite material may be formed by braiding, automated fibre placement (AFP), prepreg wrap techniques or pultrusion methods. However in preferred examples the composite structural component is a filament wound structure. Filament winding techniques are particularly well-suited for making composite structural components from carbon-fibre reinforced polymer (CFRP).

A filament wound composite structural component may be formed so as to optimise its axial strength in both tension and compression. In a typical filament winding process for an axial force transmission component, carbon or glass fibres are wound around a mandrel in a helical fashion. For tensile strength, the fibres are wound at angles close to 0° in at least some of the layers. For compressive strength, the fibres are wound at angles close to 90° in at least some of the layers. Accordingly a composite structural component as disclosed herein may be a filament wound component comprising one or more layers of low angle fibre (e.g. fibres at angles of 8-15° to the axial direction) and one or more layers of high angle fibre (e.g. fibres at angles of 75-89° to the axial direction). In other examples a composite structural component as disclosed herein may be formed by braiding or automated fibre placement (AFP).

It will be understood that the end connection comprises an end portion of the composite structural component. Other portions of the composite structural component, for example those portions which are not in axial alignment with the end connection and its components, are not described in detail in this disclosure. The other portions of the composite structural component may optionally include one or more further components mounted internally or externally, for example an internal sleeve of metal or rubber, and/or other hoop reinforcement (in the form of hoop-wound fibres or a separate ring made of composite or metallic material).

According to the present disclosure there is further provided: A method of forming an end connection for a composite structural component made of a polymer matrix composite material, the method comprising: providing a metal interface component comprising an outer surface comprising a plurality of ridges and grooves defining an engagement surface along an axial direction and an inner surface defining a mounting surface for attachment of an end fitting; forming an end portion of the composite structural component around the engagement surface of the metal interface component so that the metal interface component is engaged with an internal surface of the composite structural component at one end of the composite structural component; and fitting an outer annular component around the end portion in axial alignment with the engagement surface so as to form an interference fit with the end portion and preload the end connection with compressive radial forces.

It will be appreciated that the step of forming the composite structural component will typically comprise heating/curing the polymer matrix composite material. Accordingly the outer annular component is fitted around the composite structural component in a subsequent manufacturing step. As is discussed above, fitting the outer annular component around the composite structural component may include choosing the degree of interference fit so as to apply a desired level of preload to the engagement surface. Choosing the degree of interference fit may take into account operational factors such as the expected or intended axial loads to be transmitted by the end connection during use. In addition, or alternatively, choosing the degree of interference fit may take into account structural factors such as the diameter and/or wall thickness of the composite structural component. In addition, or alternatively, choosing the degree of interference fit may take into account structural factors such as the angle of the ridges and grooves on the outer surface of the metal interface component. In addition, or alternatively, choosing the degree of interference fit may take into account factors that affect the radial compressive strength of the composite structural component, such as the void content, volume fraction of fibre, fibre stiffness e.g. elastic modulus, and/or selected layup of the polymer matrix composite material. In at least some examples, fitting the outer annular component around the composite structural component may include forming an interference fit of about 0.1 mm with the composite structural component. In preferred examples the interference fit is at least 80 microns, preferably at least 100 microns, more preferably at least 150 microns. This distance represents the size difference (i.e. overlap) between the internal diameter of the outer annular component and the outer diameter of the end portion.

Methods according to the present disclosure may be carried out using any suitable manufacturing technique. A fibre-reinforced polymer matrix composite material may be formed by braiding, automated fibre placement (AFP), or prepreg wrap techniques. However, in preferred examples, forming the composite structural component comprises filament winding. Filament winding techniques are particularly well-suited for making composite structural components from carbon-fibre reinforced polymer (CFRP).

In at least some examples the polymer matrix composite material comprises fibre reinforced polymer and the method further comprises: providing the metal interface component on a mandrel; and winding glass or carbon fibres around the mandrel to form the composite structural component and embed the metal interface component in the end portion of the composite structural component. Further preferably, forming the composite structural component comprises winding one or more layers of glass or carbon fibres around the mandrel at a low angle $\theta$ (e.g. $8°\le\theta\le15°$) and winding one or more layers of glass or carbon fibres around the mandrel at a high angle $\theta$ (e.g. $75°\le\theta\le89°$).

As is mentioned above, it may be desirable to provide an outer layer of fibre reinforcement that is wound circumferentially so as to help transmit the hoop compression applied by the outer annular component. Accordingly the method may further comprise: circumferentially winding glass or carbon fibres around the end portion of the composite structural component in axial alignment with the engagement surface so as to form one or more layer(s) of hoop fibre reinforcement. Filament winding or AFP may be used for this. An additional benefit of such a manufacturing step is that the hoop fibre reinforcement can fill in the crevices between the ridges and grooves that will inevitably be formed in the composite structural component where it has been wound around the metal interface component. After curing the composite structural component, the layer of circumferential fibre reinforcement can be machined back so as to provide a substantially flat (i.e. non-undulating) outer surface around which the outer annular component can then be fitted. Accordingly the method may further comprise: curing the composite structural component; and removing at least some of the layer of hoop fibre reinforcement before fitting the outer annular component. The step of removing at least some of the layer of hoop fibre reinforcement may comprise any suitable technique, e.g. machining, grinding, abrading, etc.

In various examples of the present disclosure, the method may further comprise attaching an end fitting to the mounting surface of the metal interface component. The step of attaching the end fitting may take place during manufacture of the end connection. Alternatively, the step of attaching the end fitting may take place at a later point in time, for example during use of the composite structural component to transmit axial tension/compression loads.

DETAILED DESCRIPTION

Figure 2:
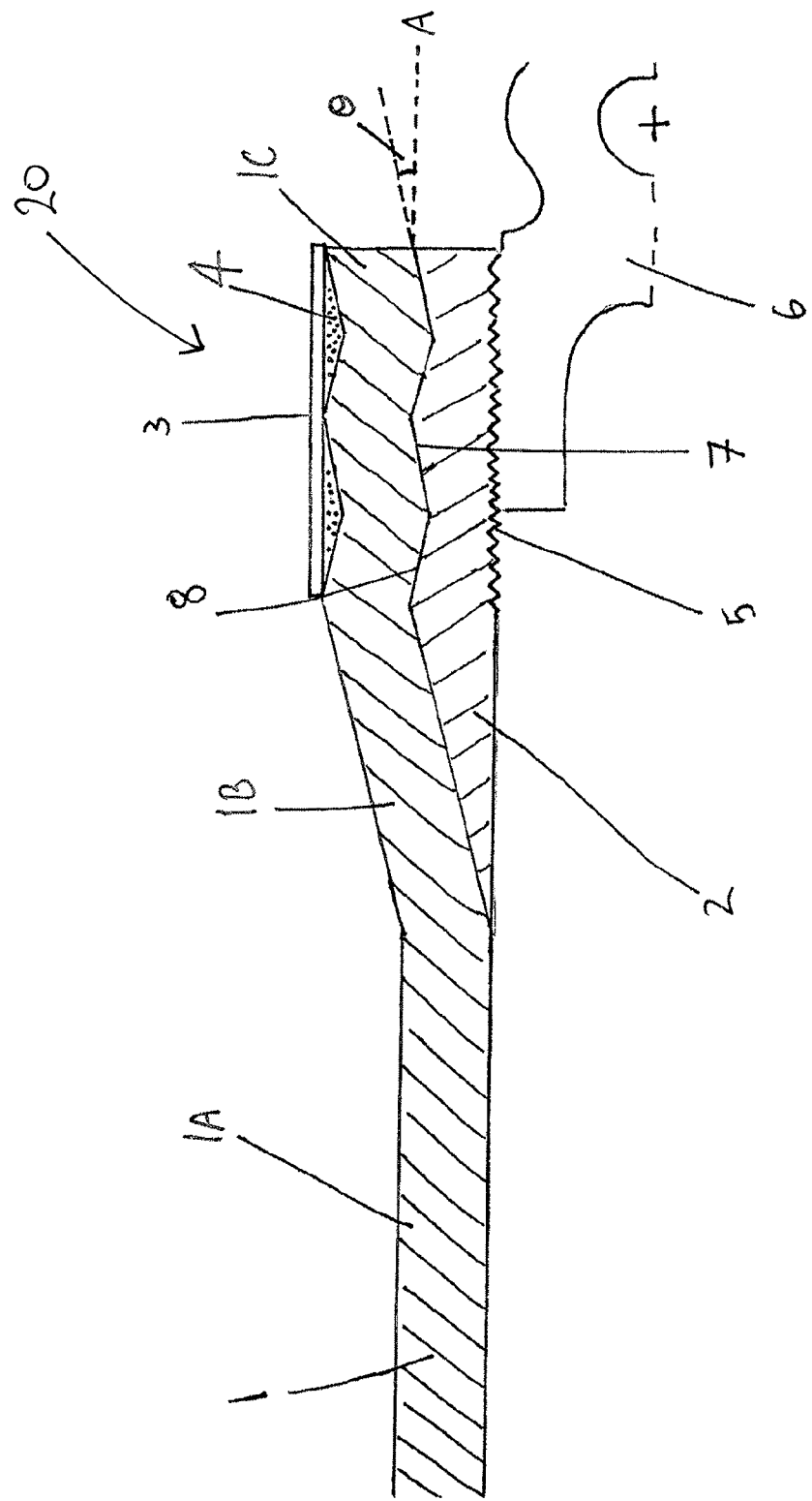

One or more non-limiting examples will now be described, by way of example only, and with reference to the accompanying figures, in which:

FIG. 1 shows an end joint of a composite rod according to a typical example of those found in the prior art; and FIG. 2 is an example of an end connection for a composite structural component according to the present disclosure.

Referring firstly to FIG. 1, a cross section of an end joint of a composite rod 76 is shown according to a typical example of those found in the prior art, comprising a main section of a rod 55, an undulating joint portion 90, and an embedded insert 10b. The main rod section 55 tapers inwards towards the undulating joint portion of substantially constant diameter at its end 90. The outer diameter of the embedded insert 10b matches the undulations of the rod, and a portion of its inner diameter is threaded 24 suitable for attaching the assembly to other structures. A casing 88 fills in the annular channels in the joint portion 90 by winding layers of hoop fibres over the assembly before heating/curing the resin material.

FIG. 2 shows an example according to the present disclosure, wherein a composite (e.g. carbon fibre reinforced composite) structural component comprises a composite rod 1 which in turn comprises a main portion 1A, a tapering portion 1B, and an end portion 1C. The end portion 1C has an internal surface 8 comprising a series of ridges and grooves which extend at an angle θ relative to the axial direction A generally defined by the internal surface 8. The ridges and grooves extend circumferentially around the axial direction A. The composite rod 1 may take the form of a tube.

An end connection 20 for the composite rod 1 comprises the end portion 1C and an embedded metal insert 2, which is positioned interior to the tapering portion 1B and the end portion 1C of the composite rod 1. The embedded metal insert 2 has a constant internal diameter over its length equal to the internal diameter of the main rod portion 1A, and an outer surface 7 that follows the taper of the tapering portion 1B and comprises a series of ridges and grooves that match the ridges and grooves of the end portion 1C. The outer surface 7 of the embedded metal insert 2 mates with the internal surface 8 of the composite rod 1, such that the embedded metal insert 2 is engaged with the internal surface 8 of the composite rod 1. The outer surface 7 and internal surface 8 are first and second engagement surfaces of the end connection 20.

The internal diameter of the insert 2 is equal to or slightly greater than the internal diameter of the main section 1A of the composite rod 1. A mounting surface 5 defined by an inner surface of the embedded insert 2 is threaded, in this example, to allow for attachment to a suitably threaded end fitting 6, for example a rod end, as is illustrated here. Of course, the mounting surface 5 could take other forms.

Hoop fibres 4 are wound circumferentially around the end portion 1C, and subsequently a hoop ring 3 is fitted in an interference fit over the hoop fibres 4 and the end portion 1C, such that the end portion 1C of the composite rod 1 is preloaded with compressive radial forces, resulting in hoop compression. Compression of the end connection 20 results in a greater normal contact force between the rod 1 and the insert 2, such that the frictional force resisting relative movement of the outer surface 7 of the embedded insert 2 and the internal surface 8 of the end portion 1C is increased. A greater ability to resist relative movement minimises wear when the rod 1 is placed under axial tension or compression.

When the end fitting 6 is put under tensile load in the axial direction, the threaded portion 5 acts to transfer this load into the embedded insert 2. The ridges and grooves of the end portion 1C at the surface 8 and the associated ridges and grooves at the surface 7 of the embedded insert 2 transfer this axial force into the composite rod 1 and in doing so produce a tensile hoop force on the end portion 1C of the rod 1. The compressive preloading of the end portion 1C by the hoop ring 3 allows for a greater axial load to be transferred to the rod 1 before a failure occurs due to excessive hoop force than if there were no preloading. Similarly, the compressive preloading performed by the hoop ring 3 allows a greater compressive axial load to be placed on the end fitting 6 before failure of the rod 1.

Example

A composite structural component in the form of a rod or strut is well suited to high static and fatigue axial load requirements, typically in the range of 50 kN and above.

For an axial load requirement of 250 kN, the internal diameter of the composite rod may be 45 mm with a wall thickness of 3 mm. Three tapered ridges with a taper angle θ of 15° are formed at the engagement surface with a metal insert, to aid manufacture of the rod and hence laminate quality. Compressive preloading of the end connection is achieved using an interference fit of approximately 0.1-0.15 mm between the hoop ring and machined composite rod surface. Without this compressive preloading, significant tensile hoop stresses would result under axial tensile and compressive loads of 50-250 kN.

The invention claimed is:

1. An end connection comprising:
   the end connection comprising:
   a composite structural component made of a polymer matrix composite material and comprising an end portion, the end portion comprising an internal surface comprising a plurality of ridges and grooves defining a first engagement surface along an axial direction and an outer layer of circumferential fibre reinforcement;
   a metal interface component comprising an outer surface comprising a plurality of ridges and grooves defining a second engagement surface along the axial direction and an inner surface defining a mounting surface for attachment of an end fitting;
   wherein the metal interface component is engaged with the internal surface of the composite structural component by mating of the first and second engagement surfaces; and
   an outer annular component fitted around the outer layer of circumferential fibre reinforcement of the end portion in axial alignment with the mating of the first and second engagement surfaces;
   wherein the outer annular component forms an interference fit with the end portion so as to preload the end connection with compressive radial forces.

2. An end connection according to claim 1, wherein the outer annular component forms an interference fit of about 0.1 mm with the end portion of the composite structural component.

3. An end connection according to claim 1, wherein the ridges and grooves defining the first engagement surface extend at an angle θ relative to the axial direction of the first engagement surface, wherein θ≤20°.

4. An end connection according to claim 1, wherein the outer surface of the metal interface component comprises a tapered portion and an engagement portion comprising the plurality of ridges and grooves, wherein the tapered portion tapers radially outwardly from an end of the metal interface component to the engagement portion.

5. An end connection according to claim 1, further comprising an end fitting attached to the mounting surface of the metal interface component.

6. An end connection according to claim 1, wherein the composite structural component comprises the end portion and a main portion;
   wherein the end portion has a first internal diameter and the main portion has a second, smaller internal diameter that substantially matches the internal diameter of the metal interface component.

7. An end connection according to claim 6, wherein the internal surface of the composite structural component tapers radially inwards from the end portion to the main portion.

8. An end connection according to claim 6, wherein the outer surface of the metal interface component comprises a tapered portion and an engagement portion comprising the plurality of ridges and grooves, wherein the tapered portion tapers radially outwardly from an end of the metal interface component to the engagement portion.

9. An end connection according to claim 6, further comprising an end fitting attached to the mounting surface of the metal interface component.

10. A method of forming an end connection for a composite structural component made of a polymer matrix composite material, the method comprising:
providing a metal interface component comprising an outer surface comprising a plurality of ridges and grooves defining an engagement surface and an inner surface defining a mounting surface for attachment of an end fitting;
forming an end portion of the composite structural component around the engagement surface of the metal interface component so that the metal interface component is engaged with an internal surface of the composite structural component at one end of the composite structural component;
circumferentially winding fibres around the end portion of the composite structural component in axial alignment with the engagement surface so as to form an outer layer of circumferential fibre reinforcement; and
fitting an outer annular component around the outer layer of circumferential fibre reinforcement of the end portion of the composite structural component in axial alignment with the engagement surface so as to form an interference fit with the end portion and preload the end connection with compressive radial forces.

11. A method according to claim 10, wherein the polymer matrix composite material comprises fibre reinforced polymer, the method further comprising:
providing the metal interface component on a mandrel; and
winding glass or carbon fibres around the mandrel to form the composite structural component and embed the metal interface component in the end portion of the composite structural component.

12. A method according to claim 11, wherein forming the composite structural component comprises winding glass or carbon fibres around the mandrel at a low angle θ between 8° and 15° and winding one or more layers of glass or carbon fibres around the mandrel at a high angle θ between 75° and 89°.

13. A method according to claim 10, further comprising curing the composite structural component; and
removing at least some of the layer(s) of hoop fibre reinforcement before fitting the outer annular component.

14. A method according to claim 11, further comprising attaching an end fitting to the mounting surface of the metal interface component.

* * * * *